United States Patent Office 3,283,593
Patented Nov. 8, 1966

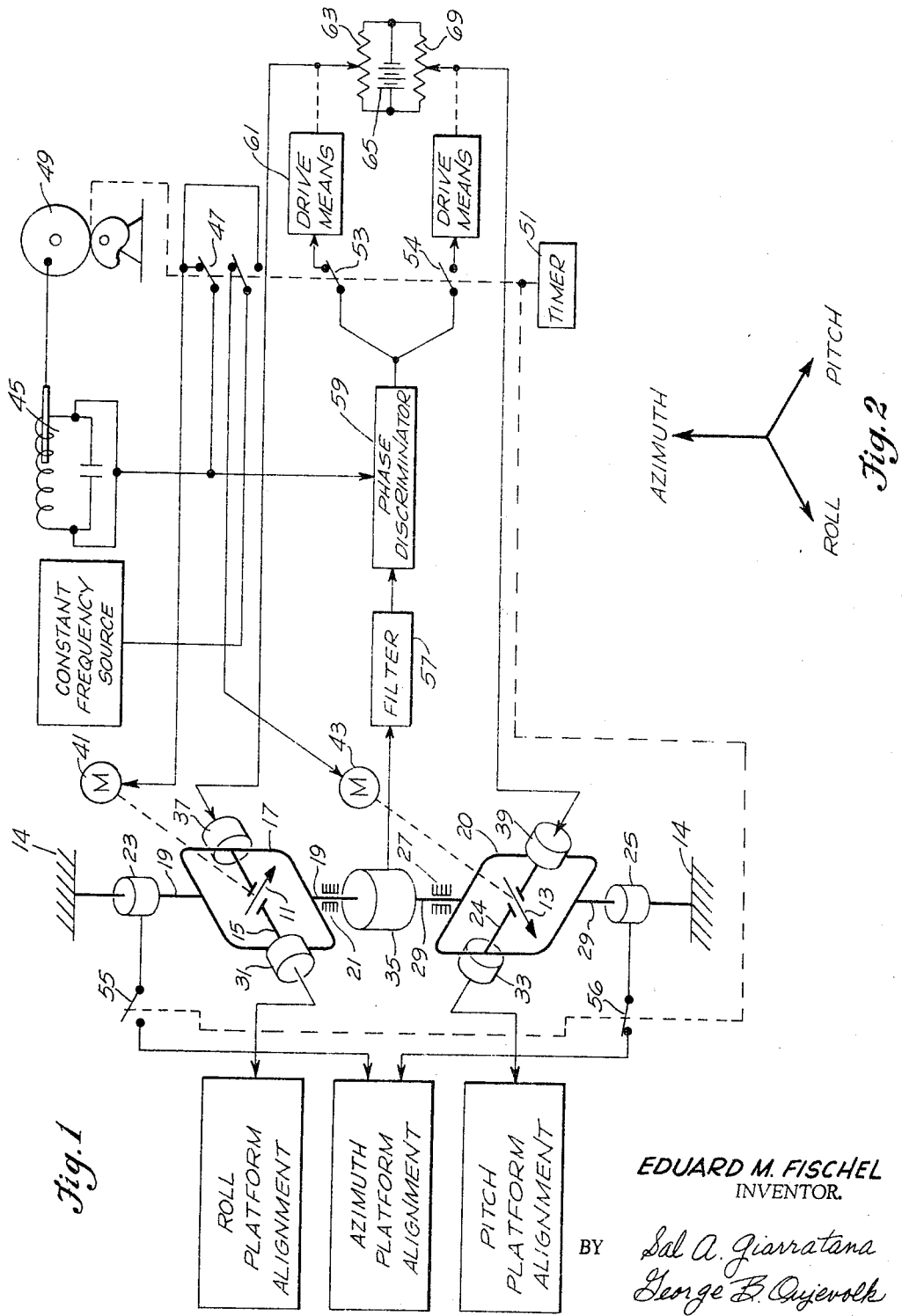

3,283,593
AUTOMATIC GYRO DRIFT COMPENSATION
Eduard M. Fischel, Wayne, N.J., assignor to General Precision Inc., Little Falls, N.J., a corporation of Delaware
Filed Jan. 26, 1962, Ser. No. 168,987
2 Claims. (Cl. 74—5.37)

This invention relates to gyro drift compensation and more particularly to a system for automatically correcting compensation for azimuth drift in a gyro platform system.

The amount of compensation desired can be determined by making use of the angular momentum cycling principle. According to this principle the drift of the gyro is inversely proportional to its angular momentum. Therefore, if the angular momentum of a gyro is made to vary cyclically at a predetermined frequency the rate at which the gyro will drift will vary cyclically at this same frequency. The drift rate of the gyro will be proportional to the magnitude of the cyclical variation in drift and the phase of the cyclical variation in drift will indicate the direction of the drift. Thus by detecting the cyclical variation in a drift that results when the angular momentum of the gyro is cyclically varied, the direction and magnitude of the drift can be determined and the compensation for the drift can be automatically corrected.

The way that this cyclical variation in drift is detected in the present invention is by using another gyro on the platform as a reference. Cyclical variation of the angular rotation of the first gyro with respect to the second gyro is detected and a signal is produced proportional to this cyclical variation. This signal is used to change a drift compensating torque to cancel out the azimuth drift which gave rise to the signal. After a predetermined length of time the drift compensation on the second gyro is corrected in the same manner by using the first gyro as a reference. The process is then repeated continuously to provide continuous automatic correction for the drift compensation. The gyro which is not being cycled is used in the alignment loop of the platform. In this manner the output signal representing the rate of azimuth drift is made independent of the control of the azimuth alignment of the platform and a self-sustaining system is made possible. Moreover the noise in the signal representing the drift rate is reduced because the signal is independent of any platform movement.

If the angular momentum cycling principle were used to correct the drift compensation on the single gyro without reference to a second gyro, the signal to be utilized would have to be derived from the azimuth loop and therefore would be carrying all the noise of this loop and the system could not be made self-sustaining.

Accordingly, the principal object of this invention is to provide an improved system for automatically correcting the compensation for gyro drift.

A further object of this invention is to provide a self-sustaining system for automatically correcting the compensation for gyro drift.

A further object of this invention is to automatically correct the compensation for a gyro drift.

A still further object of this invention is to provide a system for correcting the compensation for gyro drift by making use of the angular momentum cycling principle.

Further objects and advantages of this present invention will become readily apparent as the following detailed description of the invention unfolds and when taken in conjunction with the drawings wherein:

FIG. 1 schematically illustrates the system of the invention; and

FIG. 2 shows the reference axes for FIG. 1.

As shown in FIG. 1 of the drawings, the system comprises two gyros 11 and 13 each having two degrees of freedom mounted in a dumbbell arrangement on the gyro platform 14. The gyro 11 has its axis of rotation aligned with the direction of the pitch axis and the gyro 13 has its axis of rotation aligned with the direction of the roll axis. FIG. 2 illustrates the direction of the pitch, roll and azimuth axes for the system as shown in FIG. 1. The gyro 11 is fixed to an axle 15 which is rotatably mounted on a gimbal frame 17. The axle 15 is aligned with the direction of the roll axis so that the gyro 11 is free to pivot about an axis parallel to the roll axis. The gimbal frame 17 is rotatably mounted by means of the coaxial axles 19 between a bearing 21 fixed to the gyro platform 14 and a control transformer 23 also fixed to the gyro platform. The axles 19 are aligned with the direction of the azimuth axis, thus permitting the gyro 11 to pivot about an axis parallel to the azimuth axis. In this manner the gyro 11 is given two degrees of freedom to pivot about axes parallel to the pitch and azimuth axes.

The gyro 13 is mounted on an axle 24 which is aligned with the direction of the pitch axis. The axle 24 is rotatably mounted on a gimbal frame 20 which in turn is rotatably mounted between a control transformer 25 and a bearing 27 by means of axles 29, which are coaxial with the axles 19. The axles 29 are aligned with the direction of the azimuth axis so that the gyro 13 is free to pivot about axes parallel to the pitch and azimuth axes. A control transformer 31 measures the rotation of the axle 15 in the gimbal frame 17 and a control transformer 33 measures the rotation of the axle 24 in the gimbal frame 20.

When the platform 14 starts to pivot about the roll axis, the axle 15 will start to turn in the gimbal frame 17 thus causing an output signal to be produced from the control transformer 31. The output signal from the control transformer 31 is then fed to the positioning apparatus for the gyro platform 14 which rotates the gyro platform 14 about the roll axis so that the axles 19 and 29 are maintained aligned with the direction of the azimuth axis and the axle 24 is maintained aligned with the direction of the pitch axis. Similarly, the output signal from the control transformer 33 controls the positioning of the platform about the pitch axis to maintain the alignment of the system.

The control transformers 23 and 25 are alternately used in the system in a manner to be described below to control the alignment of the platform about the azimuth axis. The axles 19 and 29 are connected to a differential control transformer 35 between the bearings 21 and 27. The differential control transformer 35 in response to the rotation of the axles 19 and 29 will produce an output signal representing the difference between the amount that the axle 19 is rotated and the amount that the axle 29 is rotated. Thus when the gyros 11 and 13 drift in azimuth, the difference in their drift in azimuth will be represented by the output signal from the diffeerntial transformer 35 and this output signal from the differential transformer 35 will be independent of the control loops for the platform 14. The output signal from the differential transformer 35 is used to determine the correction required to counteract the azimuth drift of the gyros 11 and 13. The azimuth drift of the gyro 11 is counteracted by a torquer 37, which is adapted to apply a torque to the axis 15 and therefore is adapted to apply a torque to the gyro 11 about an axis parallel to the roll axis. A torque applied to the gyro 11 about this axis would cause the gyro 11 to precess about an axis parallel to the azimuth axis. Thus by applying the correct torque to the axle 15 from the torquer 37, the azimuth drift of the gyro 11 can be canceled out. In a similar manner the azimuth drift of the gyro 13 can be canceled out by torque applied to the axle 24 by means of a torquer 39. The amount of torque applied to the axles 15 and 24 by the torquers 37 and 39 is determined by the magnitude of the energizing current applied to these torquers.

The output signal from the differential transformer 35 is used to determine the currents to be applied to the torquers 37 and 39 to cancel out the azimuth drift of the gyros 11 and 13. This determination from the output signal of the differential transformer 35 is made by means of the angular momentum cycling principle. According to this principle if the angular momentum of a gyro is cycled up and down, the rate at which the gyro is drifting will decrease and increase at the frequency at which the angular momentum is being cycled. This phenomenon occurs because the rate at which a gyro drifts is dependent upon the angular momentum of a gyro, the greater the angular momentum, the slower the gyro will drift.

The gyro 11 is driven by a motor 41 and the gyro 13 is driven by a motor 43. The speed at which the motors 41 and 43 drive the gyros 11 and 13 can be varied by means of a cycler 45. As shown in FIG. 1 the cycler 45 can be connected to either the motor 41 or the motor 43 by means of a switch 47. Cycler 45 is a device known in the art wherein a reciprocating motion is imparted to a core in an inductance coil by a timer, e.g., timer 49. This varies the inductance of the coil, changing the frequency of the output. When one gyro is connected to the cycler, the other is at constant speed. When the switch 47 connects the cycler 45 to the motor 41 it will cyclically increase and decrease the speed at which the gyro 11 is driven by the motor 41. The frequency at which the speed of the gyro 11 is cycled in this manner is determined by a timer 49, which controls the cycler 45. In this manner the angular momentum of the gyro 11 is cycled at a predetermined frequency. Similarly the angular momentum of the gyro 13 is cycled at this predetermined frequency when the cycler 45 is connected to the motor 43 by means of the switch 47.

The position of the switch 47 is controlled by a timer 51, which may be the same timer as timer 49 or a separate device as shown in the drawing, which also controls the position of switches 53 through 56 simultaneously with the switch 47. When the angular momentum of the gyro 11 is being cycled, the rate at which the gyro 11 is drifting will vary at the frequency at which the gyro 11 is being cycled. Hence the output signal produced by the differential control transformer 35 will have a component cyclically varying at a frequency equal to the frequency at which the angular momentum of the gyro 11 is being cycled. The magnitude of this cyclically varying component in the output signal of the differential control transformer 35 will be proportional to the rate at which the gyro 11 is drifting in azimuth.

The phase of the cyclically varying component in the output signal of the differential transformer 35 relative to the cyclical variation in angular momentum will indicate the direction in which the gyro 11 is drifting in azimuth. The output signal from the differential control transformer 35 is filtered by means of a filter 57, which only passes the cyclically varying component in the output signal from the differential control transformer 35. This output signal of the filter 57 is fed to a phase discriminator 59, which is synchronized by means of the cycler 45. The phase discriminator 59 produces a D.C. output signal proportional to the output signal of the filter 57 with a polarity indicative of the phase of the output signal of the filter 57. The magnitude of the output signal of the discriminator 59 will thus represent the drift and its polarity will represent the direction of the drift. When the switch 47 connects the cycler 45 to the motor 41, the switch 53 will be controlled by the timer 51 to connect the output signal from the phase discriminator 59 to a driving means 61, which in response to the output signal of the phase discriminator 59 drives a movable contact of a potentiometer 63 in a direction depending upon the polarity of the applied signal.

A battery 65 applies a D.C. voltage across the resistance of the potentiometer 63. The movable contact of the potentiometer 63 is connected to the torquer 37 so that the current energizing the torquer 37 is controlled by the position of the movable contact of the potentiometer 63. The direction in which the movable contact of the potentiometer 63 is moved by the drive means 61 in response to the signal from the discriminator 59 will be such that the current applied to the torquer 37 will be changed in a direction to reduce the drift of the gyro 11 which gave rise to the output signal from the phase discriminator 59. For example, if the gyro 11 is drifting in azimuth in a clockwise direction, the phase discriminator 59 will produce an output signal of one polarity. In response to this polarity, the drive means 61 will move the movable contact on the potentiometer 63 in a direction to change the torque applied to the axle 15 by the torquer 37 to reduce the drift of the gyro in the clockwise direction. Similarly, when the gyro 11 is drifting in a counterclockwise direction, the discriminator 59 will produce an output signal of the opposite polarity and the movable contact of the potentiometer 63 will be moved in the opposite direction. This action will cause the torque applied by the torquer 37 to change in a direction to reduce the azimuth drift of the gyro 11 in the counterclockwise direction. The drive means 61 will move the movable contact of the potentiometer 63 until the output signal from the phase discriminator 59 goes below a minimum at which time the azimuth drift of the gyro 11 will be generally compensated.

The timer 51 will connect the cycler 45 to the motor 41 for a predetermined length of time, after which the timer 51 will disconnect the cycler 45 from the motor 41 and connect it to the motor 43. The gyro 13 will then have its angular momentum cycled in the same manner that the angular momentum of the gyro 11 was cycled. The differential transformer 35 will then have a cyclically varying component having a magnitude and phase representing the rate and direction of the azimuth drift of the gyro 13 and the phase discriminator 59 will produce an output signal having a magnitude and polarity representing the rate and direction of this azimuth drift.

When the cycler 45 is switched from the motor 41 to the motor 43, the timer 51 disconnects the output signal from the phase discriminator 59 from the drive means 61, and connects it to a drive means 67 by means of switches 53 and 54. In response to the output signal of the phase discriminator 59, the drive means 67 drives the movable contact of a potentiometer 69. The battery 65 is also connected across the potentiometer 69. The movable contact of the potentiometer 69 controls the energizing current of the torquer 39. The drive means 67 will drive the movable contact of the potentiometer 69 until the torque applied by the torquer 39 cancels out the drift in azimuth of the gyro 13. After a predetermined time the switches 47, 53 and 54 are again switched back to their original position and the operation is again repeated on the gyro 11.

The timer 51 will continue to cause the compensation of the gyros 11 and 13 to be corrected alternately in this manner. Thus the compensation for the azimuth drift of the gyros 11 and 13 is accurately maintained. The switches 55 and 56, which are controlled by the timer 51 in synchronism with the switches 47, 53 and 54, selectively connect the output signals from the control transformers 23 and 25 to the apparatus for maintaining the azimuth alignment of the platform with the gyros 11 and 13. When the switch 47 is in a position to connect the cycler 45 to the motor 41 and the gyro 11 is being cycled, the switch 56 will connect the output signal from the control transformer 25 to the azimuth alignment apparatus for the platform 14 and the switch 55 will be opened, so that the control transformer 25 operating in response to the gyro 13 maintains the azimuth alignment of the platform 14 while the gyro 11 is being cycled. Similarly, when the gyro 13 is being cycled, the switch 55 will be closed and the switch 56 will be opened, so that the control transformer 23 operating in response to the position of the gyro 11 will control the azimuth alignment of the platform 14 while the gyro 13 is being cycled.

Thus there is provided a system for accurately maintaining compensation for the azimuth drift of a gyro system. Because the azimuth drift is determined by comparing the drift of one gyro to the other, the output signal representing the azimuth drift is independent of the control of the alignment of the platform and the system is self-sustaining. Moreover, the output signal representing the drift has very little noise as a result of the signal being independent of platform movement.

Although the gimbal type arrangement as described with reference to FIG. 1 is preferred, the invention can be used with two gyros mounted shoulder-to-shoulder, in which case the differential control transformer 35 would have to be replaced by two control transformers and a difference between the output signals represented by the two control transformers would have to be developed. The principle of the invention can also be applied to single degree freedom gyros by putting them coaxially together with a differential transmitter between them attached to their output axes. Two more gyros of the one degree of freedom type, however, are then required for the roll and pitch stabilization. These and many other modifications may be made to the above described specific embodiment of the invention without departing from the spirit and scope of the invention.

What is claimed is:

1. A system comprising a platform, a first gyro including a motor to rotate the gyro, means of pivotally mounting said first gyro on said platform, a second gyro including a motor to rotate the gyro, means of pivotally mounting said second gyro on said platform, cycler means operatively connected to the motors of said first and second gyros to periodically cyclically vary in magnitude the angular momentum of said first gyro and then cyclically vary in magnitude the angular momentum of said second gyro, means to detect the cyclical variations in the pivoting of said first gyro with respect to said second gyro at the frequency of the cyclical variation of angular momentum, a first torquer mounted to apply a torque to said first gyro to compensate for drift, a second torquer mounted to apply a torque to said second gyro to compensate for drift, and means responsive to the cyclical variation detected by said detecting means when the magnitude of the angular momentum of said first gyro is being cyclically varied to change the torque applied to said first gyro by said first torquer in a direction to reduce the cyclical variation detected by said detecting means and responsive to the cyclical variation detected by said detecting means when the magnitude of the angular momentum of said second gyro is being cyclically varied to change the torque applied to said second gyro by said second torquer in a direction to reduce the cyclical variation detected by said detecting means.

2. A system comprising a platform, a first gyro including a motor to rotate the gyro, means pivotally mounting said first gyro on said platform, a second gyro including a motor to rotate the gyro, means pivotally mounting said second gyro on said platform, cycler means operatively connected to the motors of said first and second gyros to periodically cyclically vary in magnitude the angular momentum of said first gyro and then cyclically vary in magnitude the angular momentum of said second gyro, means to detect the cyclical variation in the pivoting of said first gyro with respect to said second gyro at the frequency of the cyclical variation of angular momentum, a first torquer mounted to apply a torque to said first gyro to compensate for drift, a second torquer mounted to apply a torque to said second gyro to compensate for drift, means responsive to the cyclical variation detected by said detecting means when the magnitude of the angular momentum of said first gyro is being cyclically varied to change the torque applied to said first gyro by said first torquer in a direction to reduce the cyclical variation detected by said detecting means and responsive to the cyclical variation detected by said detecting means when the magnitude of the angular momentum of said second gyro is being cyclically varied to change the torque applied to said second gyro by said second torquer in a direction to reduce the cyclical variation detected by said detecting means, and means responsive to the pivoting of said second gyro when the magnitude of the angular momentum of said first gyro is being cyclically varied to control the alignment of said platform and responsive to the pivoting of said first gyro when the magnitude of the angular momentum of said second gyro is being cyclically varied to control the alignment of said platform.

References Cited by the Examiner

UNITED STATES PATENTS

| | | | |
|---|---|---|---|
| 2,835,131 | 5/1958 | Vacquier et al. | 74—5.37 |
| 2,999,391 | 9/1961 | Freebairn et al. | 74—5.37 |
| 3,176,524 | 4/1965 | Schlitt et al. | 74—5.37 |

FRED C. MATTERN, JR., *Primary Examiner.*

BROUGHTON G. DURHAM, *Examiner.*

K. DOOD, P. W. SULLIVAN, *Assistant Examiners.*